United States Patent
Hickey et al.

(10) Patent No.: US 7,975,172 B2
(45) Date of Patent: Jul. 5, 2011

(54) REDUNDANT EXECUTION OF INSTRUCTIONS IN MULTISTAGE EXECUTION PIPELINE DURING UNUSED EXECUTION CYCLES

(75) Inventors: Mark J Hickey, Rochester, MN (US); Adam J Muff, Rochester, MN (US); Matthew R Tubbs, Rochester, MN (US); Charles D Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/191,331

(22) Filed: Aug. 14, 2008

(65) Prior Publication Data

US 2010/0042813 A1 Feb. 18, 2010

(51) Int. Cl.
*G06F 11/00* (2006.01)
(52) U.S. Cl. ................... 714/10; 714/9; 714/11; 714/17
(58) Field of Classification Search .................. 714/2, 9, 714/10, 11, 17, 25, 35, 37, 41, 48, 49, 52
See application file for complete search history.

(56) References Cited

U.S. PATENT DOCUMENTS

| | | | | |
|---|---|---|---|---|
| 6,543,028 | B1 * | 4/2003 | Jamil et al. ..................... | 714/52 |
| 7,100,027 | B1 * | 8/2006 | Padwekar ....................... | 714/17 |
| 7,272,751 | B2 * | 9/2007 | Beacom et al. ................. | 714/37 |
| 7,370,230 | B1 * | 5/2008 | Flake .............................. | 714/10 |
| 2001/0025338 | A1 * | 9/2001 | Zumkehr et al. ................ | 714/17 |
| 2004/0153763 | A1 * | 8/2004 | Grochowski et al. ........... | 714/17 |
| 2004/0243893 | A1 * | 12/2004 | Mudge et al. .................. | 714/724 |
| 2008/0229145 | A1 * | 9/2008 | Bose et al. ...................... | 714/10 |
| 2008/0250271 | A1 * | 10/2008 | Ozer et al. ...................... | 714/15 |
| 2009/0113240 | A1 * | 4/2009 | Vera et al. ....................... | 714/17 |
| 2009/0217077 | A1 * | 8/2009 | Busaba et al. .................... | 714/2 |

* cited by examiner

*Primary Examiner* — Robert Beausoliel
*Assistant Examiner* — Joseph D Manoskey
(74) *Attorney, Agent, or Firm* — Wood, Herron & Evans, LLP

(57) ABSTRACT

A pipelined execution unit uses the bubbles that occur during execution to selectively repeat operations performed in one or more stages of a multistage execution pipeline to verify the results of such operations during otherwise unused execution cycles for the execution pipeline. Whenever a bubble follows a particular instruction within an execution pipeline, the result of an operation that is performed for that instruction by a particular stage of the execution pipeline may be stored, and the operation may be repeated by the stage in a subsequent execution cycle in which no productive operation would otherwise be performed due to the presence of the bubble. The results of the operations may then be compared and used to either verify the original result or identify a potential error in the execution of the instruction.

19 Claims, 7 Drawing Sheets

REDUNDANT EXECUTION OF INSTRUCTIONS IN MULTISTAGE EXECUTION PIPELINE DURING UNUSED EXECUTION CYCLES

FIELD OF THE INVENTION

The invention is generally related to data processing, and in particular to processor architectures and execution units incorporated therein.

BACKGROUND OF THE INVENTION

Ionizing radiation such as alpha particles have the unfortunate ability to change the electrical state of electronic devices, often causing soft errors that may prevent such devices from operating properly. Often times designers will attempt to soft-error-proof an electronic device by employing redundancy coupled with voting circuitry in their designs to ensure that errant behavior is unlikely. Thus, rather than using a single logic circuit to compute a result, multiple redundant logic circuits are used, and the results are compared by separate voting circuitry to determine the correct result from among the results output by the redundant logic circuits.

Redundant circuitry, however, occupies valuable area on an integrated circuit chip and often increases power consumption substantially. This area and power consumption increase may also reduce the overall performance of an electronic device, since clock frequency may need to be reduced for a variety of reasons, including the need to accommodate the longer wires needed for larger circuit areas.

Redundant circuitry may be employed at a number of levels within the design of an electronic device, including, for example, within an execution unit of a processor. An execution unit constitutes the logic that executes the instructions that are supplied to a processor. And, whereas processors once included only a single execution unit, given the increased focus on parallelism in modern processor architectures, an execution unit is often one of many execution units that may be present on a given integrated circuit chip.

For example, at the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations, e.g., fixed point or floating point operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Particularly with pipelined execution units, the circuit area required to implement redundant circuitry within certain stages of a pipeline, as well as the additional latency required to implement voting, can have an adverse impact on both the overall area and the performance of an execution unit. Furthermore, when multiple execution units are used in a given design, the adverse impacts are compounded.

Another problem experienced in many execution units is that of inefficient execution of instructions within pipelines due to inter-instruction dependencies. While pipelining often improves performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and stalling the later instruction waiting for the result of an earlier instruction is said to introduce "bubbles," or cycles where no productive operations are being performed, into the pipeline.

One technique that may be used to extract higher utilization from a pipelined execution unit and remove unused bubbles is to introduce multithreading. In this way, other threads are able to issue instructions into the unused slots in the pipeline, which drives the utilization and hence the aggregate throughput up. Another popular technique for increasing performance is to use a single instruction multiple data (SIMD) architecture, which is also referred to as 'vectorizing' the data. In this manner, operations are performed on multiple data elements at the same time, and in response to the same SIMD instruction. A vector execution unit typically includes multiple processing lanes that handle different datapoints in a vector and perform similar operations on all of the datapoints at the same time. For example, for an architecture that relies on quad(4)word vectors, a vector execution unit may include four processing lanes that perform the identical operations on the four words in each vector. The aforementioned techniques may also be combined, resulting in a multithreaded vector execution unit architecture that enables multiple threads to issue SIMD instructions to a vector execution unit to process "vectors" of data points at the same time. In addition, multiple execution units may be used to permit independent operations to be performed in parallel, further increasing overall performance.

Despite all efforts to minimize the presence of bubbles in an execution pipeline, however, some bubbles are still inevitably created when executing most instruction streams. Furthermore, in addition to the reduction in performance due to bubbles being present in stages in a execution unit pipeline, the stages within which such bubbles reside still often incur some switching even though no productive work is being performed. Also, from the standpoint of power consumption, it is often the latches in a pipeline stage that draw the most power. Consequently, the switching of latches and other circuitry in pipeline stages where bubbles are present is often the source of unneeded power consumption.

Therefore, a need continues to exist in the art for a manner of protecting a circuit design from the adverse effects of ionizing radiation without the increased circuit area and decreased performance traditionally associated with redundant logic, as well as for a manner of reducing the adverse impact of bubbles within a pipelined execution unit.

SUMMARY OF THE INVENTION

The invention addresses these and other problems associated with the prior art by providing a pipelined execution unit that uses the bubbles that inevitably occur during execution to selectively repeat operations performed in one or more stages of a multistage execution pipeline to verify the results of such operations during otherwise unused execution cycles for the execution pipeline. In some embodiments of the invention, for example, whenever a bubble follows a particular instruction within an execution pipeline, the result of an operation that is performed for that instruction by a particular stage of the execution pipeline is stored, and the operation is repeated by the stage in a subsequent execution cycle in which no productive operation would otherwise be performed due to the presence of the bubble. The results of the operations are then compared and used to either verify the original result or identify a potential error in the execution of the instruction.

Consistent with one aspect of the invention, a multistage execution pipeline includes a stage configured to perform an operation during execution of an instruction by the multistage execution pipeline. In addition, control logic coupled to the multistage execution pipeline is configured to verify a result computed by the stage of the multistage execution pipeline during execution of the instruction by causing the stage to repeat the operation for the instruction during a subsequent execution cycle in which a bubble exists in the multistage execution pipeline.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
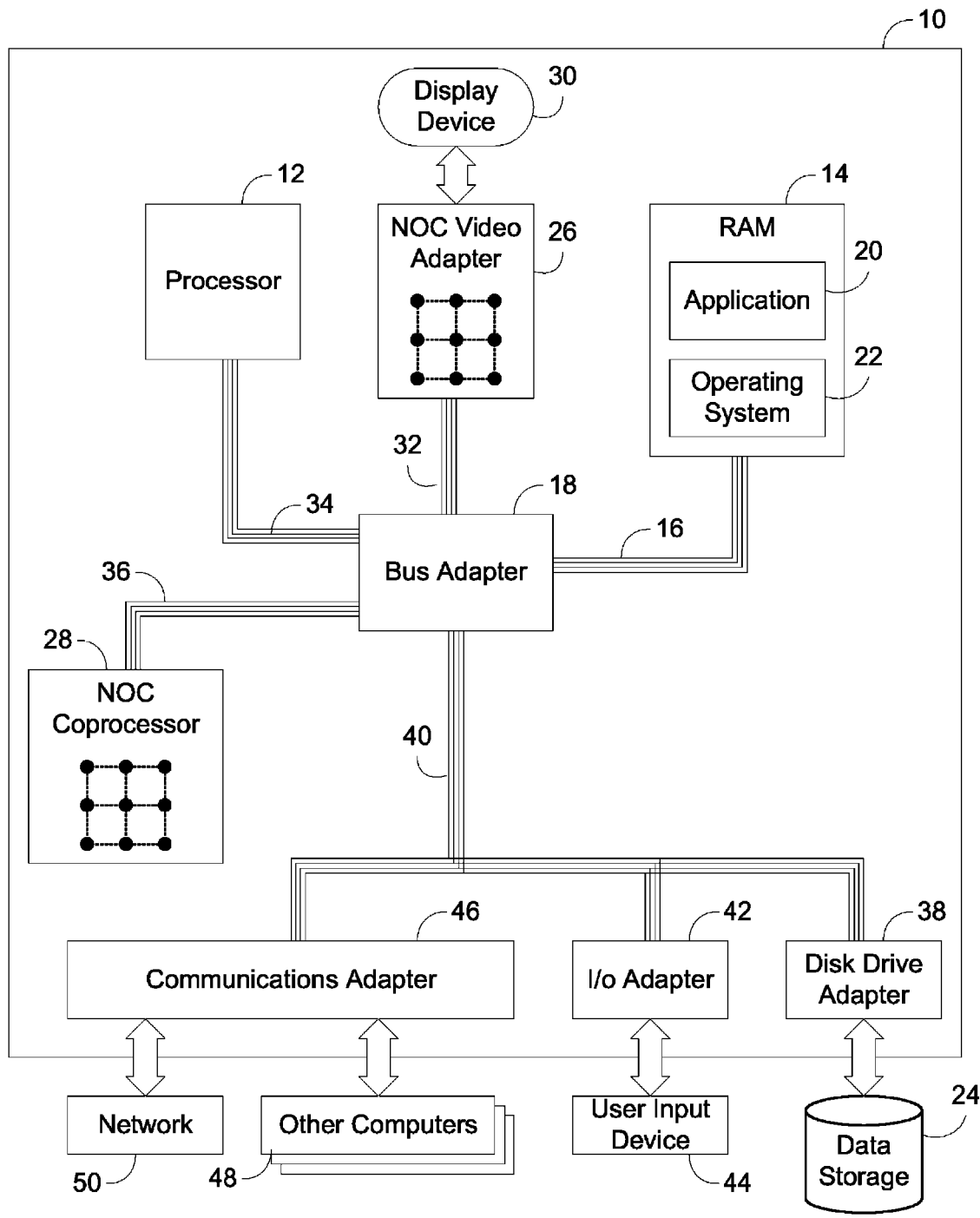
FIG. 1 is a block diagram of exemplary automated computing machinery including an exemplary computer useful in data processing consistent with embodiments of the present invention.

Embodiments consistent with the invention address the errors that may arise in integrated circuit chips due to effects such as alpha particles and other ionizing radiation without many of the adverse circuit area and performance issues resulting from the use of conventional redundant logic circuitry and voting logic. Instead, embodiments consistent with the invention utilize spare or unused cycles in an execution unit to repeat prior operations and check the results of those prior operations, such that the repeated operations are performed by the same logic used to perform the original operations, thus eliminating the need for redundant logic circuitry. In addition, in many embodiments the checking is performed in a cycle directly following a particular operation, which results in little switching and little or no increased power consumption resulting from the additional circuit logic required to implement the checking.

The techniques described herein may be used in connection with practically any type of multistage execution pipeline where bubbles, i.e., unused slots may be present in stages of the execution pipeline. Bubbles, or unused slots, may result from a number of conditions, e.g., instruction stalls such as may be due to inter-instruction dependencies, flushes, the lack of instructions awaiting execution, etc. The results of operations can be checked and verified within the immediately subsequent execution cycle, or alternatively one or more cycles may exist between when a result for an operation is first calculated and that operation is repeated and used to verify or check the original result (e.g., when an execution unit is multithreaded and instructions from other threads are also present in the pipeline).

In addition, the techniques described herein may be used in connection with practically any type of operation that may be performed during the execution of an instruction in a multistage execution pipeline, e.g., the result of an arithmetic operation such as addition, subtraction, multiplication, division, square root, reciprocal estimate, round, exponentiation, logarithm, a logic operation such as AND, OR, NAND, NOR, XOR, or NOT, a shift or rotate operation, a data type conversion operation, table lookup operation, trigonometric instruction, combinatorial logic control blocks, etc., whether a vector or scalar operation. The results of such operations may represent the final result from the execution of an instruction, or an intermediate result that is calculated during one stage of execution in the pipeline. The result of an operation may be the result that is passed onto the next stage, or may even represent an intermediate result within a given stage of the pipeline.

In addition, the manner in which operations may be checked or verified may differ in different embodiments of the invention. In the embodiments discussed hereinafter, for example, an operation may be verified by calculating and storing a parity from the result of an operation, and then calculating a parity when the operation is repeating and signaling a miscompare if the respective parities do not match. In other embodiments, however, other manners of verifying a result may be used, e.g., based upon storing and comparing the full result, computing an error correcting code (ECC) or checksum, residue code, etc.

Other modifications will be apparent to one of ordinary skill in the art having the benefit of the instant disclosure.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
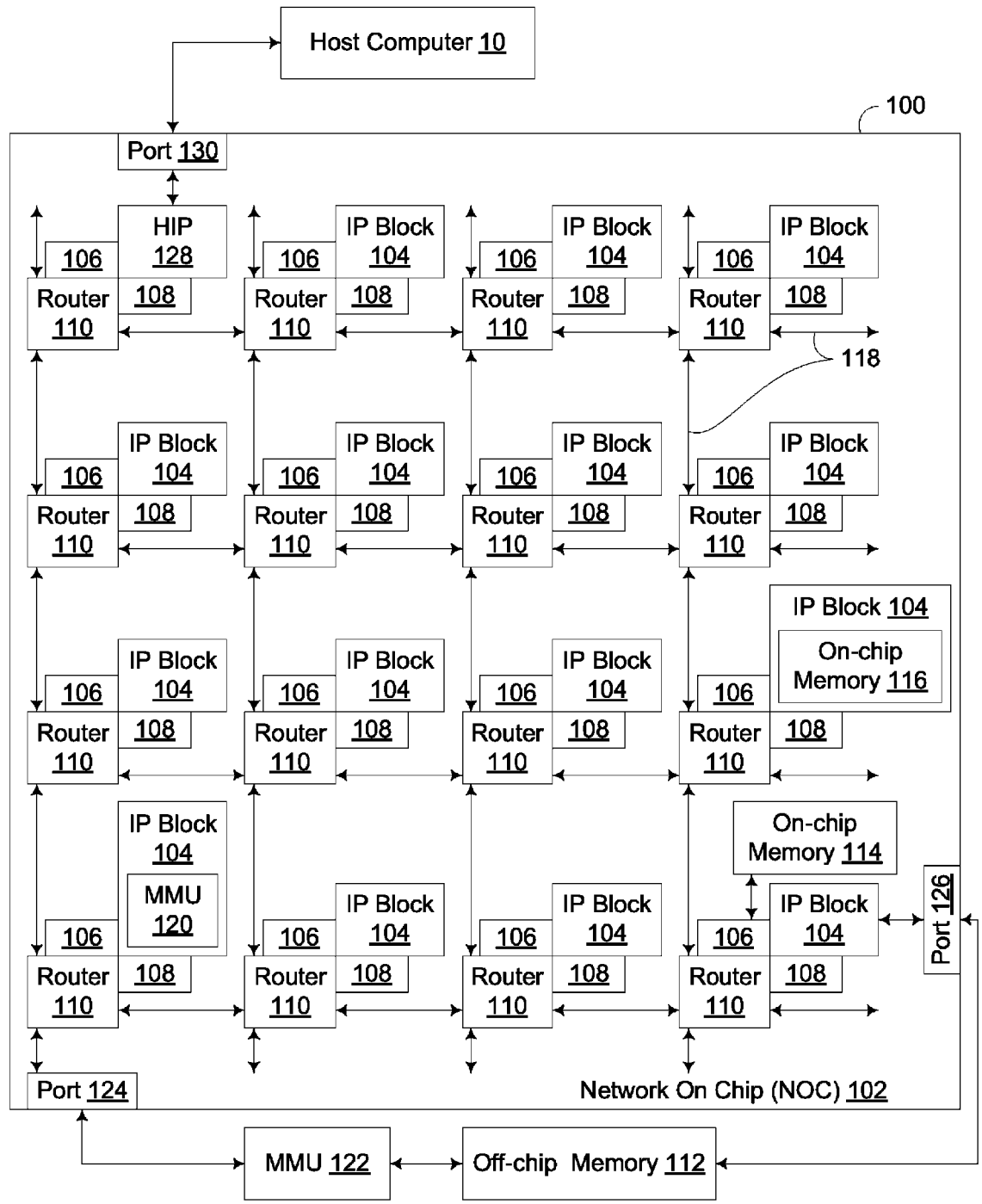
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bidirectional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
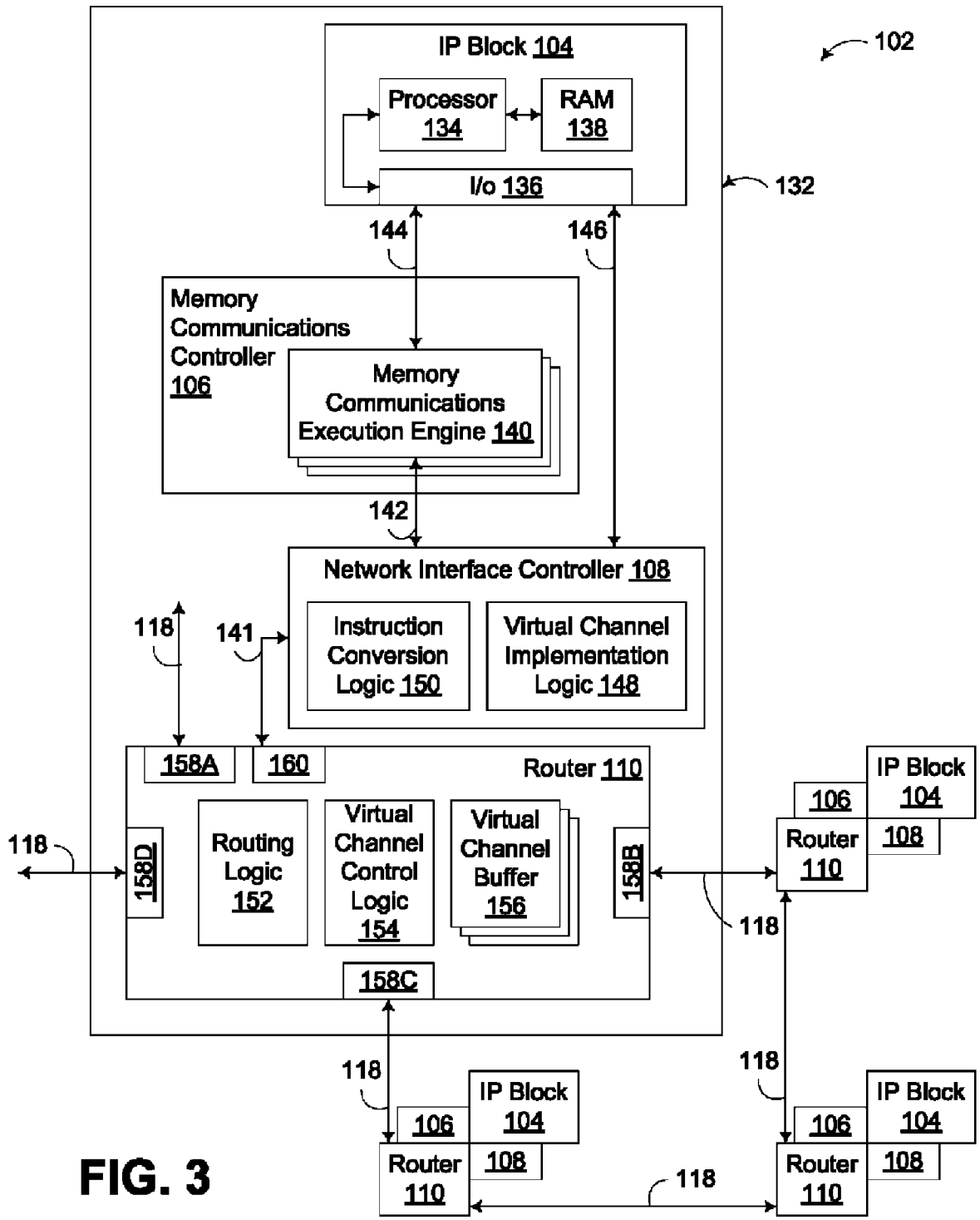
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
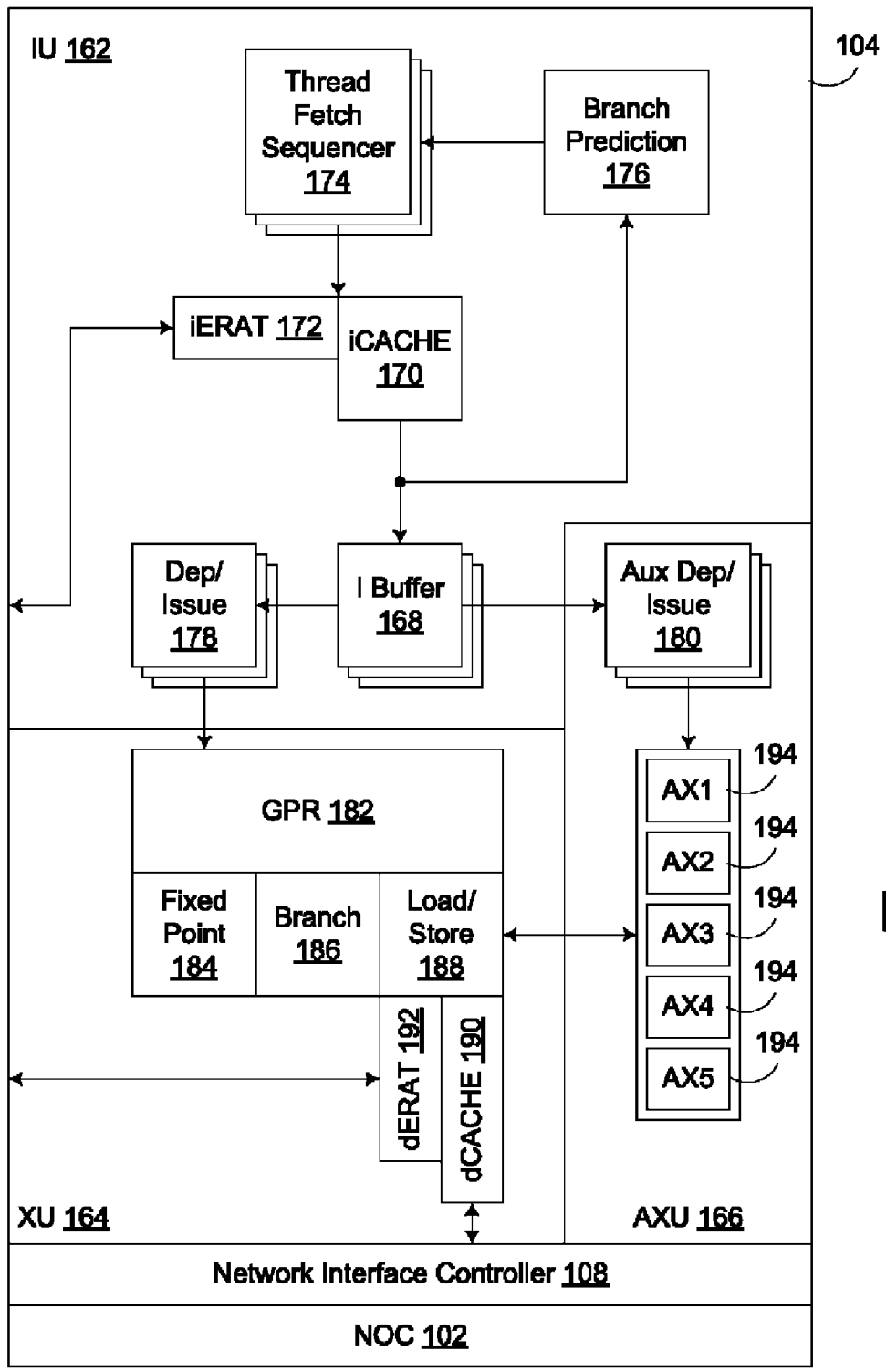
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Figure 5:
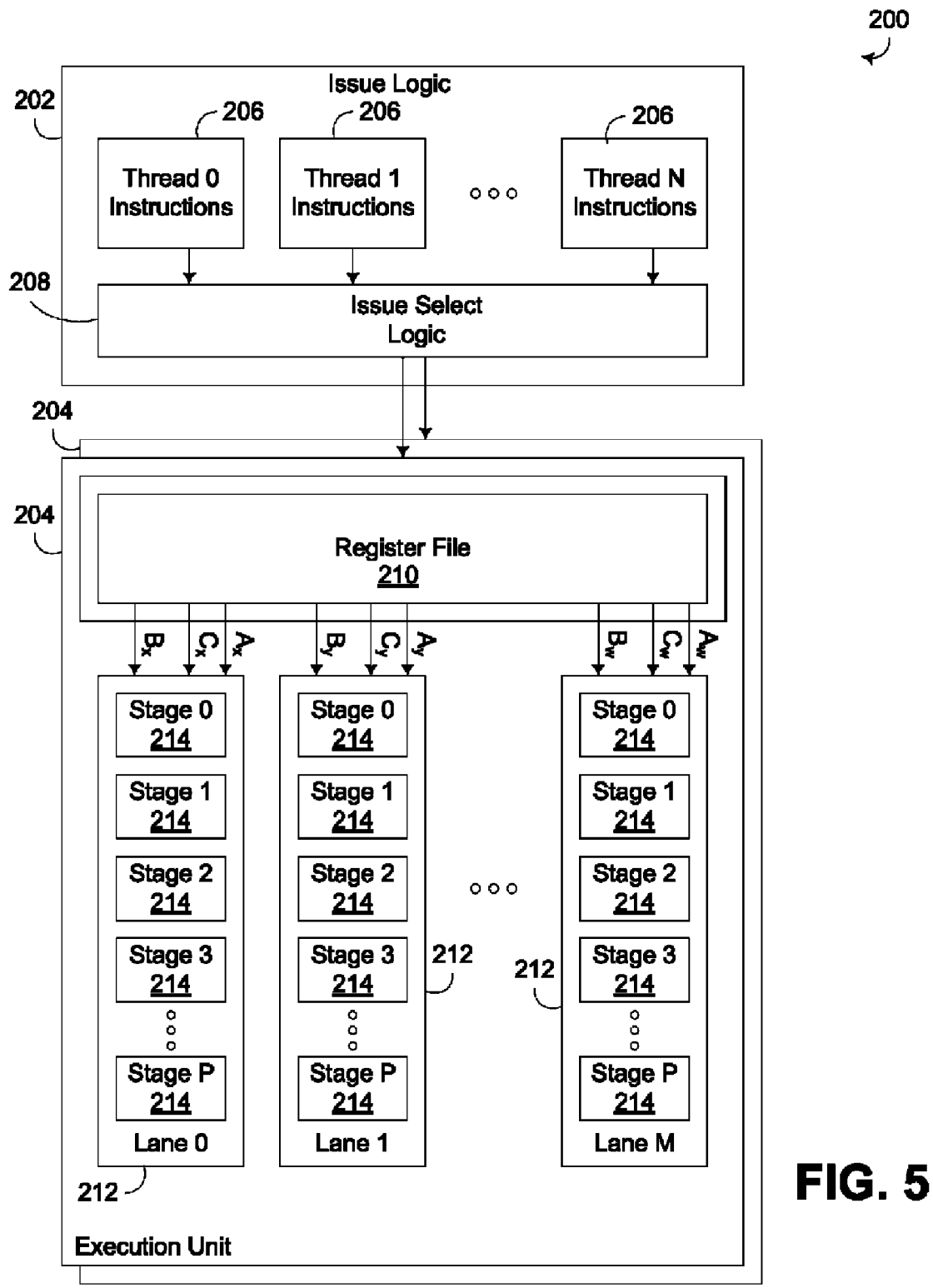
FIG. 5 is a block diagram of a processing unit incorporating a multistage execution pipeline consistent with the invention, and capable of being implemented within an IP block from the NOC of FIG. 2.

Multistage Execution Pipeline with Result Verification During Unused Execution Cycles Turning now to FIG. 5, this figure illustrates an exemplary processing unit 200 incorporating a multistage execution pipeline capable of performing result verification of instructions during unused execution cycles in a manner consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Processing unit 200 includes issue logic 202 that issues instructions to one or more execution units 204. Issue logic 202 includes issue select logic 208 that is capable of issuing instructions from a plurality (N) of threads, illustrated at 206. Issue select logic 208 operates to schedule the issuance of instructions by the various threads, and typically includes logic for managing dependencies between instructions, in a manner generally understood in the art. When multiple execution units 204 are supported, issue select logic 208 is capable of issuing multiple instructions to the multiple execution units each cycle. In some embodiments, however, only one execution unit may be supported, and furthermore, in some embodiments multi-threaded issue of instructions may not be supported.

Each execution unit 204 processes instructions issued to the execution unit by issue logic 202, and includes a register file 210 coupled to a plurality (M) of processing lanes or sub-units 212 capable of processing data stored in register file 210 based upon the instructions issued by issue logic 202, and storing target data back to the register file. A number of different register file architectures may be used consistent with the invention, e.g., using 128 quadword (128b) vector registers, or any different number and/or differently sized vector registers as appropriate. Each execution unit 204 may be implemented as a number of different types of execution units, e.g., floating point units, fixed point units, or specialized execution units such as graphics processing units, encryption/decryption units, coprocessors, XML processing units, etc., and may be implemented either as vector or scalar-based units. In addition, an execution unit 204 may include only a single processing lane in some embodiments.

In the illustrated embodiment, each processing lane 212 defines an execution pipeline that includes a plurality (P) of pipeline stages 214, and each pipeline stage 214 performs one or more operations for which a result is generated. In the illustrated embodiment, one or more pipeline stages are coupled to control logic that is capable of verifying a result of an operation performed by the pipeline stage by causing the pipeline stage to repeat the operation during a subsequent, unused execution cycle in which a bubble exists in the pipeline. It will be appreciated that multiple pipeline stages 214 and/or multiple pipelines 212 may include result verification capability consistent with the invention. Which pipelines stages and pipelines incorporate such functionality will differ in different embodiments, and may differ for different instructions processed thereby.

Figure 6:
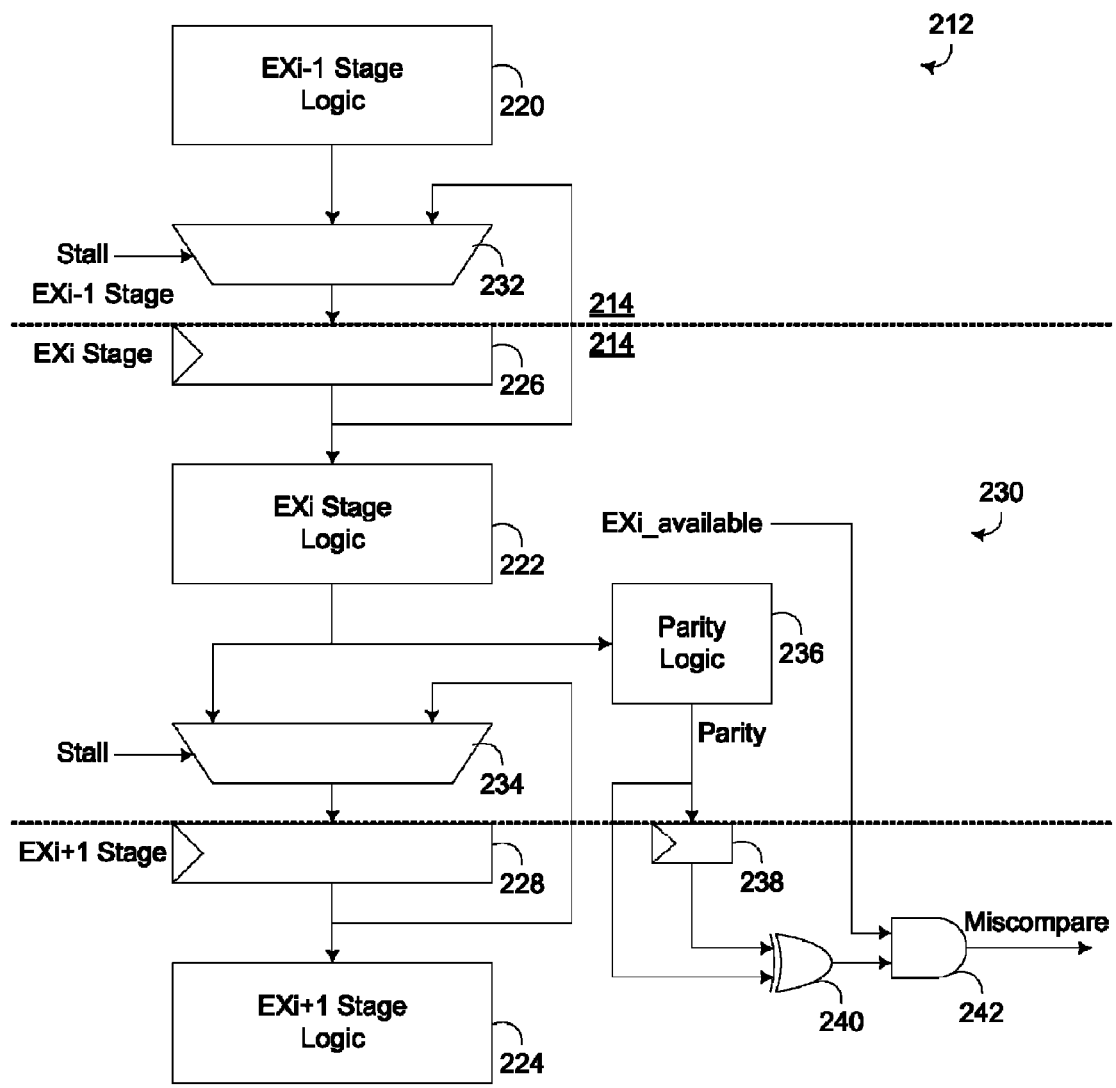
FIG. 6 is a block diagram of an exemplary implementation of a stage from one of the multistage execution pipelines referenced in FIG. 5.

FIG. 6 illustrates in greater detail of plurality of stages 214 in an execution pipeline 212. Specifically, the figure illustrates three execution stages 214, respectively denoted as execution stages EXi−1, EXi, and EXi+1, each of which including respective stage execution logic 220, 222 and 224 that implements the functional logic for the respective stage. Each stage also includes one or more stage latches coupled to an input of the respective stage execution logic to latch results of the prior stage for use as input data in the associated stage. Thus, execution stage EXi is illustrated as including a stage latch 226, while execution stage EXi+1 is illustrated as including a stage latch 228. The stage latch for execution stage EXi−1 has been omitted for clarity.

In this implementation, execution stage EXi is coupled to control logic 230, which is configured to verify the result of an operation performed by step execution stage logic 222. In addition, a multiplexer 232 is coupled between the output of the previous stage execution logic 220 and the input of stage latch 226, and is used to selectively feed back the stored contents of stage latch 226 to be stored back into stage latch 226 responsive to a stall signal. In particular, the stall signal is asserted whenever a bubble is being propagated to the subsequent stage, e.g., due to an instruction stall resulting from an inter-instruction dependency. Thus, whenever a prior stage has a bubble, or unused slot, rather than storing the output of stage execution logic 220 in stage latch 226, as would occur whenever a valid instruction is being passed from the prior stage to execution stage EXi, the input data that was processed by stage execution logic 222 during the prior execution cycle will be reused for the next execution cycle, thus effectively repeating the operation performed by stage execution logic 222 on successive cycles.

It will be appreciated that any other stage in which operation results are verified will also typically include a multiplexer coupled to the input of the associated stage latch to enable the contents of the stage latch to be fed back to the input of the stage latch. Thus, for example, if execution stage EXi+1 also includes verification capability, a multiplexer 234 may also be coupled to the input of stage latch 228.

Control logic 230 includes parity logic 236 which receives the output of stage execution logic 222, representing the result of the operation performed by stage execution logic 222. Parity logic 236 generates a parity value from the result, which is output both to a temporary latch 238 into the output of an XOR logic gate 240. In the alternative, parity logic 236 may perform other verification operations, e.g., storing the full result, calculating a checksum, calculating an ECC, etc.

Latch 238 is gated by the same clock signal as each stage latch 226, 228, such that the parity value generated during the initial generation of a result by stage execution logic 222 will be output by latch 238 on the subsequent execution cycle when the same operation is repeated by the stage execution logic. The output of latch 238 is provided as the other input to XOR logic gate 240, so that, at any given instant, XOR logic gate 240 compares the parity value generated by parity logic 236 during the current execution cycle and the immediately preceding execution cycle. Therefore, XOR logic gate 240 acts as a comparator that asserts a logic "1" value whenever the parity values from the current and immediately preceding execution cycles are different.

XOR logic gate 240 outputs to one input of an AND logic gate 242, which receives at its other input an EXi_available signal, which is asserted whenever the stage is currently processing an available/unused slot (i.e., whenever a bubble is present in execution stage EXi, and thus, execution stage EXi is currently repeating and verifying the last operation). AND logic gate 242 outputs a miscompare signal, which is asserted whenever the parity values from the current and immediately preceding execution cycles differ (i.e., when the result calculated during the preceding execution cycle cannot be verified) and when the execution stage is not processing a valid instruction (i.e., when a bubble or available slot is in the execution stage). Whenever execution stage EXi is processing a valid instruction, or whenever the result of the operation performed in the previous execution cycle has been verified, the miscompare signal output by AND logic gate 242 will not be asserted.

Figure 7:
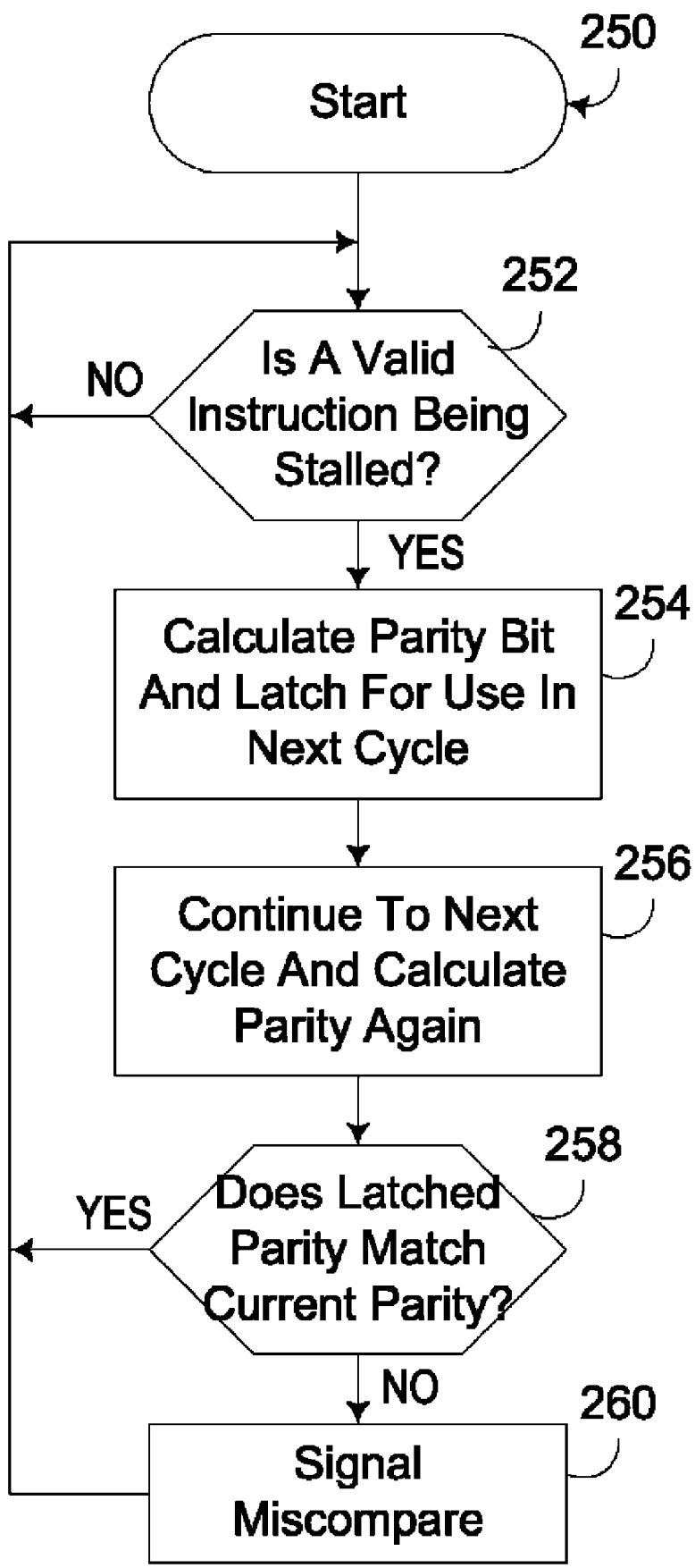
FIG. 7 is a flowchart illustrating a sequence of operations performed by the stage referenced in FIG. 6.

FIG. 7 next illustrates a flowchart 250 illustrating the sequence of operations performed by control logic 230. In particular, during a current execution cycle, block 252 determines whether a valid instruction is currently being stalled, and thus, a bubble is present in the associated stage. If no valid instruction is being stalled, no verification is performed, and block 252 loops back onto itself. If, however, a valid instruction is being stalled, block 252 passes control to block 254 to calculate a parity bit and latch the parity bit for use in the next execution cycle. Next, block 256 continues to the next execution cycle and calculates the parity again. Block 258 then determines whether the latched parity matches the current parity. If so, control returns to block 252. Otherwise, if the parities do not match, a miscompare is signaled in block 260, before returning to block 252.

In response to the signaling of a miscompare, various actions may be taken. For example, the execution unit may flush the execution pipeline and otherwise restore the working state of the execution unit to the state that existed prior to execution of the unverified instruction, thus enabling execution to be restarted beginning with the offending instruction. Alternatively, a restore could be performed by a kernel using the state saved from the last context switch.

Therefore, by utilizing spare cycles in an execution unit to check the results of prior operations, embodiments consistent with the invention typically avoid the additional circuit area associated with the use of redundant circuits to verify the results of operations performed by an execution unit. In addition, in many instances, the effect on performance and power consumption will be minimal. Furthermore, while in some applications the herein-described techniques will not provide the same degree of error correction coverage that triple redundancy and voting provides, the techniques nonetheless generally provide a significant increase in error detection without an extremely costly area increase, thus making the techniques ideal for applications where ionizing radiation is still present, but not as prevalent as may be found in outer space or near a nuclear reactor. Among other potential applications, mission-critical data center server microprocessors may find a benefit from the increased reliability and performance provided by the herein-described techniques.

Various additional modifications will be apparent to one of ordinary skill having the benefit of the instant disclosure. Therefore, the invention lies in the claims hereinafter appended.

What is claimed is:

1. A circuit arrangement, comprising:
   an integrated circuit device including:
   a multistage execution pipeline including a stage configured to perform an operation during execution of an instruction by the multistage execution pipeline; and
   control logic coupled to the multistage execution pipeline and configured to verify a result computed by the stage of the multistage execution pipeline during execution of the instruction by causing the stage to repeat the operation for the instruction during a subsequent execution cycle in which a bubble exists in the multistage execution pipeline, wherein the multistage execution pipeline is configured to perform the operation during a first execution cycle, wherein the control logic is configured to cause the stage to repeat the operation during a second execution cycle, and wherein the control logic is configured to verify the result by storing first result data computed by the stage during execution of the instruction in the first execution cycle and comparing the stored first result data with second result data computed by the stage during the repeat of the operation during the second execution cycle.

2. The circuit arrangement of claim 1, wherein the second execution cycle is immediately subsequent to the first execution cycle.

3. The circuit arrangement of claim 1, wherein the bubble is disposed in the stage during the second execution cycle.

4. The circuit arrangement of claim 1, wherein the first and second result data each comprise a parity value.

5. The circuit arrangement of claim 1, wherein the first and second result data each comprise an output generated by stage execution logic disposed in the stage.

6. The circuit arrangement of claim 1, wherein the first and second result data each comprise at least one of a checksum and an error correcting code.

7. The circuit arrangement of claim 1, wherein the stage includes stage execution logic configured to perform the operation, the circuit arrangement further comprising a stage latch configured to provide input data to the stage execution logic and a multiplexer coupled to an input of the stage latch, the multiplexer configured to feed back the input data stored in the stage latch during the first execution cycle to the input of the stage latch during the second execution cycle in response to an instruction being stalled in the multistage execution pipeline.

8. The circuit arrangement of claim 7, wherein the control logic includes:
   parity logic coupled to an output of the stage execution logic and configured to generate a parity value at an output thereof;
   an XOR gate having first and second inputs and an output, wherein the first input of the XOR gate is coupled to the output of the parity logic; and
   a parity latch having an input coupled to the output of the parity logic and an output coupled to the second input of the XOR gate.

9. The circuit arrangement of claim 8, wherein the control logic further includes an AND gate including first and second inputs and an output, the first input coupled to the output of the XOR gate and the second input configured to receive an available signal representative of whether a valid instruction is being executed in the stage, wherein the AND gate is configured to assert a miscompare signal at the output thereof in response to the result not being verified by the control logic.

10. A program product comprising a recordable computer readable medium and logic definition program code resident on the computer readable medium and defining the circuit arrangement of claim 1.

11. A method of verifying execution of an instruction by a multistage execution pipeline, the method comprising:
   during a first execution cycle, performing an operation in a stage of the multistage execution pipeline during execution of the instruction by the multistage execution pipeline; and
   during a second execution cycle subsequent to the first execution cycle in which a bubble exists in the multistage execution pipeline, verifying a result computed by the stage of the multistage execution pipeline during execution of the instruction by causing the stage to repeat the operation for the instruction, wherein verifying the result includes storing first result data computed by the stage during execution of the instruction in the first execution cycle and comparing the stored first result data with second result data computed by the stage during the repeat of the operation during the second execution cycle.

12. The method of claim 11, wherein the second execution cycle is immediately subsequent to the first execution cycle.

13. The method of claim 11, wherein the bubble is disposed in the stage during the second execution cycle.

14. The method of claim 11, wherein the first and second result data each comprise a parity value.

15. The method of claim 11, wherein the first and second result data each comprise an output generated by stage execution logic disposed in the stage.

16. The method of claim 11, wherein the first and second result data each comprise at least one of a checksum and an error correcting code.

17. The method of claim 11, wherein the stage includes stage execution logic configured to perform the operation, the method further comprising controlling a multiplexer coupled to an input of a stage latch that provides input data to the stage execution logic to selectively feed back the input data stored in the stage latch during the first execution cycle to the input of the stage latch during the second execution cycle in response to an instruction being stalled in the multistage execution pipeline.

18. The method of claim 17, further comprising:
   generating a parity value using parity logic coupled to an output of the stage execution logic;
   communicating the parity value to a first input of an XOR gate; and
   communicating the parity value to a parity latch having an output coupled to a second input of the XOR gate.

19. The method of claim 18, further comprising:
   communicating a first signal from an output of the XOR gate to a first input of an AND gate;
   communicating a second signal representative of whether a valid instruction is being executed in the stage to a second input of the AND gate; and
   selectively asserting a miscompare signal at an output of the AND gate in response to the result not being verified.

* * * * *